United States Patent Office 3,447,470
Patented June 3, 1969

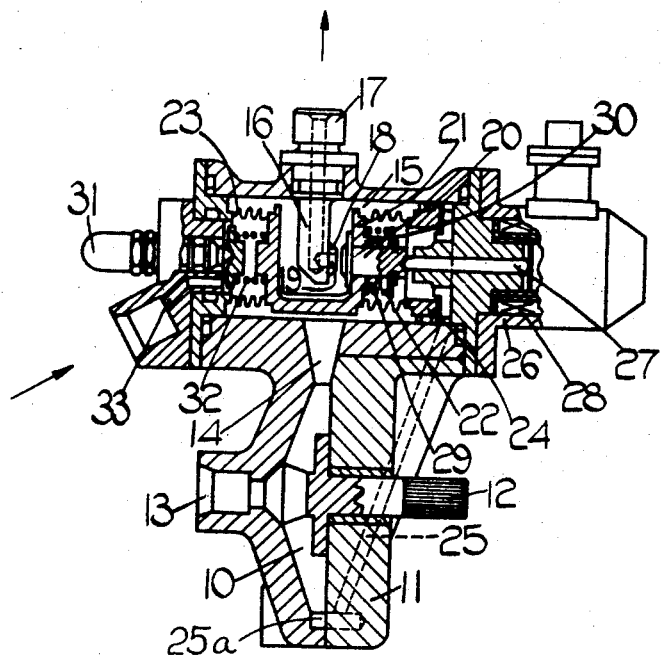

3,447,470
FLUID PUMPS
Harry Simister Bottoms and Geoffrey Arthur Lewis, Solihull, England, assignors to Joseph Lucas (Industries) Limited, Birmingham, England, a company of Great Britain
Filed Mar. 3, 1967, Ser. No. 620,410
Claims priority, application Great Britain, Mar. 4, 1966, 9,514/66
Int. Cl. F04d *15/02;* F16k *31/14*
U.S. Cl. 103—97                     2 Claims

ABSTRACT OF THE DISCLOSURE

A pump has a pressure rise responsive bellows assembly to which pressures at upstream and downstream of the pump are applied, this assembly controlling escape of liquid through an outlet by means of a valve which in turn is responsive to the position of the bellows assembly.

---

This invention relates to fluid pumps particularly, though not exclusively for use in delivering fuel to an internal combustion engine of the gas turbine type. In such pumps it is desirable that the quantity of fuel delivered should be dependent upon the speed of the engine by which it is driven.

The object of this invention therefore is to provide a pump in which the delivery of fluid is dependent upon the speed of the pump.

In accordance with the present invention a pump has means for controlling the discharge of liquid being pumped, said means being responsive to changes in the pressure rise created by the pump.

The invention will now be described by way of example with reference to the accompanying drawings in which:

The single figure is a cross-sectional view of one form of the invention.

Referring to the construction shown in the drawing there is provided a liquid pump for delivering fuel to a gas turbine internal combustion engine. The pump comprises a bladed rotor 10 mounted in a body 11, there being a shaft 12 by which the bladed rotor is driven by the engine to which the pump is intended to supply fuel. The body 11 incorporates an inlet passage 13 disposed substantially on the axis of rotation of the rotor 10, and an outlet passage 14 extending generally tangentially of the rotor 10 in a known manner, and arranged to discharge into a cavity 15 in the body 11.

Extending into the cavity 15 is a tubular member 16 communicating with an outlet 17 whereby fuel can be delivered to the engine, the tubular member 16 having at its end within the cavity 15 a seating 18 surrounding an entry orifice 19 for fuel from the cavity 15 to the interior of the member 16. Engageable with the seating 18 is a valve closure member 20 mounted in a hole in one upright limb of a U-shaped member 21. Connected to this limb of the U-shaped member 21 is a bellows 22, and a second bellows 23 is connected at the remote side of the other upright limb of the U-shaped member 21. The opposite end of the bellows 22 is connected to a ring 24 carrying a seal whereby this end of the bellows is in sealing engagement with the body 11, and the interior of the bellows 22 is in communication through a passage 25 with a cavity in a volute 25a formed around the rotor 10 within the body 11, the passage 25 being spaced from the outlet passage 14, so as to partake of pressure conditions at this point in the pump. Extending through an extension 26 of the body 11 is a rod 27 engageable with the valve closure member 20 and movable axially by means of an electrical solenoid 28 housed in the extension 26 of the body 11. A spring 29 acts between a washer 30 mounted on the valve closure member 20, and the limb of the U-shaped member 21 through which the valve closure member 20 extends, with the purpose of this spring 29 being to oppose the action of the electrical solenoid 28.

The opposite end of the bellows 23 from the U-shaped member 21 is connected to an adjustment device indicated generally at 31 whereby the effective length of a spring 32 within the bellows 23 can be varied. The interior of the bellows 23 is in communication with an inlet passage 33 whereby fuel at the same pressure as that in the inlet 13 to the pump can be admitted to the interior of the bellows 23.

In use, the difference in the pressures existing within the bellows 22 and the bellows 23 respectively controls the position of the U-shaped member 21 and thus of the valve closure member 20, which in turn controls the flow of fuel through the orifice 19 and thence to the engine through the outlet 17.

The pump is of the kind in which the pressure rise created thereby between the inlet 13 and the passage 25 is directly related to the speed of rotation of the rotor 10, so that in effect, the delivery of fuel through the outlet 17 is directly dependent upon the speed of rotation of the rotor 10, which in turn is driven by the engine to which fuel is to be supplied.

Should it be desired to shut off the supply of fuel irrespective of the pressure rise created by the pump, the electrical solenoid 28 can be actuated to move the valve closure member 20 into contact with the seating 18, thus turning off flow of fuel through the orifice 19. For this purpose the valve closure 20 must be a sliding fit in the limb of the U-shaped member 21.

Having thus described our invention what we claim as new and desire to secure by Letters Patent is:

1. A centrifugal pump comprising a body, a bladed rotor within said body, said body having means defining a volute surrounding said rotor, said body having a cavity therein, an outlet passage between the volute and the cavity, a fuel inlet in communication with the volute, a fuel outlet in communication with the cavity, valve means for opening and closing the fuel outlet, a bellows assembly within the cavity including two members having axial movement within the cavity, one of said bellows members being operatively connected to said valve means, passage means in said body providing communication between said one bellows member and said volute spaced circumferentially from said outlet passage for partaking of the pressure conditions thereof, and said other bellows member being in communication with an inlet passage whereby fuel at the same pressure of that at the fuel inlet can be admitted into said other bellows member, the difference in pressure existing between the bellows assembly controlling the positions of the valve means thereby controlling the flow through the fuel outlet.

2. The centrifugal pump as claimed in claim 1, including an electrical solenoid operated mechanism operable to actuate independently the valve means for closing the fuel outlet for arresting the flow through the fuel outlet.

References Cited

UNITED STATES PATENTS

| 2,409,837 | 10/1946 | Alford. | |
|---|---|---|---|
| 2,614,498 | 10/1952 | Piccardo | 103—97 |
| 2,982,300 | 5/1961 | Jackson et al. | 137—495 |
| 3,087,430 | 4/1963 | Griswold | 103—97 |
| 3,179,123 | 4/1965 | Kowalski et al. | 137—495 |

HENRY F. RADUAZO, *Primary Examiner.*

U.S. Cl. X.R.

137—495